May 6, 1958     F. J. FONTEIN     2,833,413
SCREENING APPARATUS
Filed March 23, 1956
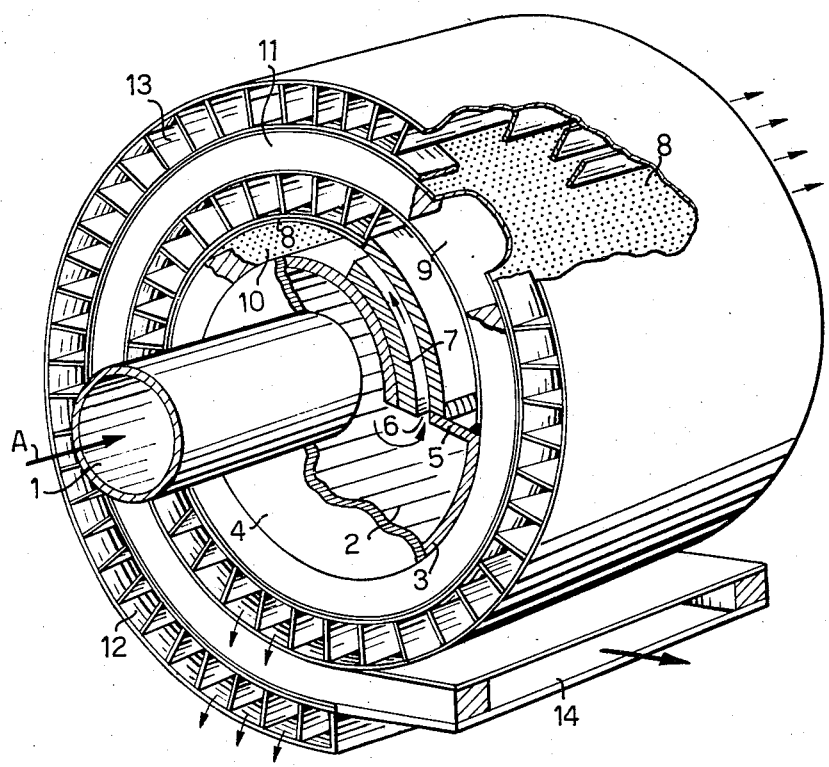
INVENTOR
FREERK J. FONTEIN
BY Cushman, Darby & Cushman
ATTORNEYS

2,833,413
SCREENING APPARATUS

Freerk J. Fontein, Heerlen, Netherlands, assignor to Stamicarbon N. V., Heerlen, Netherlands Application March 23, 1956, Serial No. 573,427

Claims priority, application Netherlands March 25, 1955

5 Claims. (Cl. 209—362)

This invention relates to particle separation and more particularly to improvements in screening apparatus of the type having a bent screening deck or sieve bend and devices to supply liquid and particles to be separated tangentially to the concave side of the screening deck and for discharging the separated fractions, as is described in my copending application Serial No. 475,251, filed December 14, 1954.

With apparatus of this type the capacity per square meter of screen surface increases as the radius decreases. The capacity also increases as the screening deck is lengthened. The capacity of the screen as referred to in this connection is to be understood as the amount of material discharged through the screen apertures per unit of time. As at a given radius the length of the screening deck is limited, it is necessary to arrange several screening decks or sieve bends in series whenever particles that are difficult to screen off are to be treated. This requires room and power.

Accordingly, it is an object of the present invention to provide a screening apparatus having a compact screening deck of maximum length and minimum radius and which, therefore, has a maximum capacity.

Another object of the present invention is the provision of a screening apparatus of the type described embodying a screening deck of increased capacity capable of handling a relatively large supply of material to be treated.

A further object of the present invention is the provision of a screening apparatus which may be used advantageously for screening to very fine particle size.

Still another object of the present invention is the provision of a screening apparatus which is compact in construction, efficient in operation and economical to manufacture and maintain.

These and other objects will become more apparent during the course of the following detailed description and appended claims.

The invention may best be understood with reference to the accompanying drawing wherein a vertical cross-sectional view of an illustrative embodiment is shown.

A suspension of the material to be screened is introduced under pressure into a drum 2 through a pipe 1. The drum has a spiral-shaped outer peripheral wall or jacket 3 and flat side wall 4. A radial wall 5 extends between the ends of the outer jacket where the radius is smallest and where the radius is largest. In this radial wall there is a slit or opening 6 to which a nozzle 7 is connected. A screening deck or sieve bend 8 is so fastened to the drum that the nozzle opens into the space between the drum and the screening deck. A plate 9 has one axial edge fastened to the outer jacket of the drum along the edge thereof where the radius is largest.

The screening deck and the plate are arranged spirally around the drum, so that between the concave side of the screening deck and the convex side of the plate there is a spiral-shaped channel or space 10, beginning at the outlet of the nozzle 7 and ending at the end of the plate. The sides of this channel are closed, as by rubber strips 11, which are likewise arranged spirally around the drum.

Between the convex side of the screening deck and the concave side of the plate there is a second spiral-shaped channel or opening 12. This channel is open at its sides, but may be divided into several compartments, as by axially extending partitions 13.

The material, which is supplied at a high rate through the nozzle 7, moves along the concave side of the screening deck through the channel 10. The fine particles and the liquid pass through the apertures in the screening deck and enter the channel 12. This fraction leaves the apparatus in a lateral direction and may be collected in a vessel (not shown) placed under the apparatus. The coarse fraction leaves the apparatus through the discharge opening 14. Naturally, it is also possible to supply the material to be separated at 14 and to collect the coarse fraction in the drum 2.

Example

An apparatus as shown in the drawing was provided with a spiral-shaped screening deck having a smallest radius of 42 mm. The total (unwound) length of the screening deck was 750 mm. and its width 87 mm. The screening deck consisted of perforated plates having passage apertures of 0.2 mm., the plates being 0.12 mm. thick and having a free surface area of 16%.

The supply consisted of 14.84 cu. meters per hour of ground sand and loess, suspended in water to a concentration of 49 g./liter. The screen underflow amounted to 14.09 cu. m./hr. at a concentration of 31 g./liter and the screen overflow was 0.76 cu. m./hr. at a concentration of 372 g./liter.

The grain size distributions of the materials in feed, screen underflow and screen overflow were:

|  | Feed in percentage | Screen underflow in percentage | Screen overflow in percentage |
| --- | --- | --- | --- |
| >150μ | 0.98 |  | 2.5 |
| 105–150 | 2.73 |  | 7.0 |
| 75–105 | 5.78 | 0.4 | 14.2 |
| 50–75 | 6.33 | 1.6 | 13.7 |
| <50μ | 84.18 | 98.0 | 62.6 |

From the above figures it is clear that the "50% grain size," i. e. the size of those grains of which 50% is contained in the screen overflow and 50% in the screen underflow, is 39μ, while the screen underflow is about 95% of the feed, which is very favorable in this fine screening treatment.

It can thus be seen that there has been provided a compact apparatus embodying a long screening deck bent at a comparatively small radius. According to the invention, the screening deck and an imperforate plate at some distance therefrom are arranged spirally around a drum whose internal space is connected on the one side to a supply device for the material to be separated or to a discharge device for the coarse fraction recovered, and on the other side, through an opening or slit in the peripheral wall, to the spiral-shaped space between the concave side of the screening deck and the convex side of the plate, which space communicates, at the point farthest from the center with a discharge device for the coarse fraction recovered or a supply device for the material to be separated, while the spiral-shaped space between the convex side of the screening deck and the concave side of the plate is connected to a discharge device for the liquid and fine particles recovered. In this way the apparatus is given a large capacity. The amount of material to be treated may then be large, too, so that the size of the supply opening may be so large that there is no danger of the same getting obstructed.

The apparatus according to the invention may be used advantageously for screening to very fine particle sizes, e. g. in the starch and flour industry.

The spiral-shaped space between the concave side of the screening deck and the convex side of the plate is preferably closed at the sides by placing rubber strips between the side edges of the plate and of the screening deck. The fine fraction may be discharged at the sides. To this end axial partitions may be provided in the spiral-shaped space between the convex side of the screening deck and the concave side of the plate. This will make the construction more robust.

The screening deck itself may be of any suitable construction and as shown comprises a perforated plate such as described in the example recited. It will be understood that a series of bars may be utilized to form the screening deck in the manner indicated in the aforesaid application, if desired.

It thus will be seen that the objects of this invention have been fully and effectively accomplished. It will be realized, however, that the foregoing specific embodiment has been shown and described only for the purpose of illustrating the principles of this invention and is subject to extensive change without departure from such principles. Therefore, this invention includes all modifications encompassed within the spirit and scope of the following claims.

I claim:

1. A screening apparatus comprising a fixed screening deck extending in a substantially spiral configuration, uninterrupted imperforate means mounted in spaced relation to said screening deck so as to define a first spiral-shaped space adjacent the concave side of said screening deck and a second spiral-shaped space adjacent the convex side of said screening deck, and means for feeding particles to be separated tangentially to one end of the concave side of the screening deck so that the coarse particles will travel from said one end through said first space along the concave side of the screening deck to the other end thereof while the fine particles pass through the screening deck into said second space.

2. A screening apparatus comprising a drum having a peripheral wall provided with a slot-shaped opening, a fixed screening deck extending from said opening in spiral formation around the drum, an uninterrupted imperforate plate extending around said drum in spaced relation to said screening deck so as to define a first spiral-shaped space on the concave side of said screening deck communicating with said drum opening and a second spiral-shaped space on the convex side of said screening deck, and means for supplying under pressure liquid and particles to be separated tangentially to the concave side of said screening deck at one end thereof so that a coarse fraction thereof will travel through said first space along the concave side of the screening deck to the other end thereof while the fine particles pass through the screening deck into said second space.

3. Apparatus as defined in claim 2 wherein said liquid and particle supplying means communicates with the interior of said drum.

4. Apparatus as defined in claim 2 wherein said first space is closed at its sides by rubber strips extending between the side edges of said screening deck and said plate.

5. Apparatus as defined in claim 2 wherein a plurality of axially extending partitions are mounted within said second space between said screening deck and said plate.

References Cited in the file of this patent
FOREIGN PATENTS 2,550     Germany _____ Aug. 9, 1877